(12) United States Patent
Jones et al.

(10) Patent No.: US 7,252,240 B1
(45) Date of Patent: Aug. 7, 2007

(54) MEMORY MODULE WHICH INCLUDES A FORM FACTOR CONNECTOR

(75) Inventors: Larry Lawson Jones, Palo Alto, CA (US); Sreenath Mambakkam, San Jose, CA (US); Arockiyaswamy Venkidu, Menlo Park, CA (US)

(73) Assignee: Onspec Electronics, Inc., Cupertino, CA (US)

( * ) Notice: Subject to any disclaimer, the term of this patent is extended or adjusted under 35 U.S.C. 154(b) by 0 days.

(21) Appl. No.: 10/063,021

(22) Filed: Mar. 12, 2002

Related U.S. Application Data

(63) Continuation-in-part of application No. 09/610,904, filed on Jul. 6, 2000, now Pat. No. 6,438,638.

(51) Int. Cl.
*G06K 19/06* (2006.01)

(52) U.S. Cl. .................. 235/492; 235/441; 235/451

(58) Field of Classification Search ................ 235/492, 235/380, 451, 441; 361/735–737; 439/630, 439/638
See application file for complete search history.

(56) References Cited

U.S. PATENT DOCUMENTS

| | | | |
|---|---|---|---|
| 5,522,049 A | | 5/1996 | Kimura et al. |
| 5,604,917 A | | 2/1997 | Saito et al. |
| 5,887,145 A | | 3/1999 | Harari et al. |
| 5,928,347 A | * | 7/1999 | Jones ........................ 710/305 |
| 5,929,416 A | * | 7/1999 | Dos Santos Pato et al. 235/439 |
| 6,011,741 A | | 1/2000 | Wallace et al. |
| 6,079,621 A | * | 6/2000 | Vardanyan et al. ......... 235/487 |
| 6,088,755 A | * | 7/2000 | Kobayashi et al. ......... 710/300 |
| 6,097,605 A | * | 8/2000 | Klatt et al. ................. 361/737 |
| 6,203,378 B1 | * | 3/2001 | Shobara et al. ............ 439/638 |
| 6,266,724 B1 | | 7/2001 | Harari et al. |
| 6,282,612 B1 | | 8/2001 | Sakajiri et al. |
| 6,317,352 B1 | | 11/2001 | Halbert et al. |
| 6,381,662 B1 | * | 4/2002 | Harari et al. ............... 710/301 |
| 6,386,920 B1 | * | 5/2002 | Sun ............................. 439/630 |
| 6,468,101 B2 | * | 10/2002 | Suzuki ....................... 439/326 |
| 6,482,029 B2 | * | 11/2002 | Nishimura ............... 439/541.5 |
| 6,607,405 B2 | * | 8/2003 | Nishimura .................. 439/630 |
| 6,666,724 B1 | * | 12/2003 | Lwee ......................... 439/630 |
| 6,745,267 B2 | * | 6/2004 | Chen et al. .................. 710/74 |
| 2001/0039603 A1 | | 11/2001 | Manowitz |
| 2003/0038177 A1 | * | 2/2003 | Morrow ...................... 235/441 |

\* cited by examiner

*Primary Examiner*—Ahshik Kim
(74) *Attorney, Agent, or Firm*—Greenberg Traurig, LLP; John P. Ward

(57) ABSTRACT

A plurality of flash (solid state) media coupled to a single form factor connector to provide a module, i.e., referred to as a SmartStack module, that can be coupled directly to a device with a SmartStack module controller. The SmartStack module does not include a controller and is controlled from the host side. The form factor connector would typically be a CompactFlash (CF) form factor or some other form factor used in a variety of devices. The SmartStack memory module in a preferred embodiment includes a write protect switch that prevents certain portions of the memory within the SmartStack module from being written to. In addition, a portion of the flash memory will be allocated to the secure area for storing information to implement various forms of security. Another portion of the flash memory is allocated to store optional biometric information such as a user's fingerprint or retinal scan information, etc. In a preferred embodiment, the SmartStack module is a flash memory card in a CF Type I or II format; however, the card will not be compatible with standard CF readers, but will be compatible with SmartStack readers. Larger memory sizes will be available as larger flash memory chips become available.

21 Claims, 5 Drawing Sheets

| Media Type | CE1 | CE2 | A3 | A5 | A6 | CD1 | CD2 |
|---|---|---|---|---|---|---|---|
| CompactFlash | 1 | 1 | 1 | 1 | 1 | 0 | 0 |
| Memory Stick | 1 | 0 | 1 | 1 | 1 | 0 | 0 |
| MMC/ SD Card | 0 | 1 | 1 | 1 | 1 | 0 | X |
| SmartStack NAND | 0 | 0 | 0 | 0 | 0 | 0 | 0 |
| SmartStack NOR | 0 | 0 | 1 | 0 | 0 | 0 | 0 |
| Reserved | 0 | 0 | 0 | 1 | 0 | 0 | 0 |
| Reserved | 0 | 0 | 1 | 1 | 0 | 0 | 0 |
| Reserved | 0 | 0 | 0 | 0 | 1 | 0 | 0 |
| Reserved | 0 | 0 | 1 | 0 | 1 | 0 | 0 |
| Reserved | 0 | 0 | 0 | 1 | 1 | 0 | 0 |
| Smart Media | 0 | 0 | 1 | 1 | 1 | 0 | 0 |

*FIG. 3*

| S[3:0] | Flash Chip |
|---|---|
| 0 | 1 |
| 1 | 2 |
| 2 | 3 |
| 3 | 4 |
| 4 | 5 |
| 5 | 6 |
| 6 | 7 |
| 7 | 8 |
| 8 | 9 |
| 9 | 10 |
| A | 11 |
| B | 12 |

*FIG. 4*

| Pin | CompactFlash Signal | SmartStack Signal |
|---|---|---|
| 14 | A6 | S0 |
| 7 | -CE1 | S1 |
| 32 | -CE2 | S2 |
| 20 | A0 | S3 |

| Byte 0 | Byte 1 | Byte 2 | Byte 3 | Description |
|---|---|---|---|---|
| C3 | B6 | 00 | Xx | Reserved |
| C3 | B6 | 01 | AAH | Secure area starts here. If Byte 3 is AA, this is the last block, else it is 00 to denote a continuation in the next block. |
| C3 | B6 | 02 | AAH | Secure area ends here. |
| C3 | B6 | 03 | AAH | Biometric area starts here. If Byte 3 is AA, this is the last block, else it is 00. |
| C3 | B6 | 04 | AAH | Biometric area ends here. |
| C3 | B6 | 05-54H | Xx | Reserved |
| C3 | B6 | 55H | Xx | Start of Firmware block, fw is < 16K. If Byte 3 is 00, then there are more blocks to follow. |
| C3 | B6 | 55H-A9H | Xx | Reserved |
| C3 | B6 | AAH | AAH | End of Firmware block. Byte 3 is AA to denote end block. |
| C3 | B6 | ABH-FEH | Xx | Reserved |
| C3 | B6 | FFH | FF | Blank Block |

*FIG. 6*

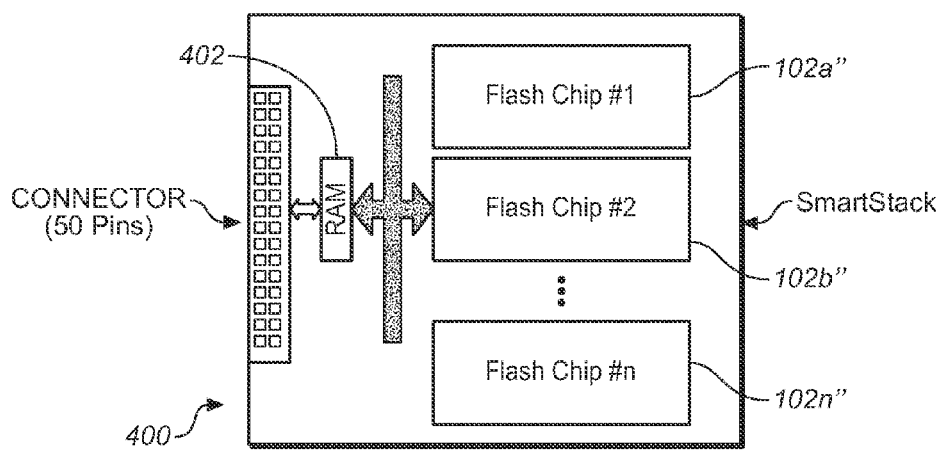

*FIG. 7*

MEMORY MODULE WHICH INCLUDES A FORM FACTOR CONNECTOR

CROSS-REFERENCE TO RELATED APPLICATIONS

This application is a Continuation-In-Part of a U.S. patent application entitled "Flash Toaster for Reading Several Types of Flash-Memory Cards With or Without a PC." Ser. No. 09/610,904, filed on Jul. 6, 2000 now U.S. Pat. No. 6,438,638.

BACKGROUND OF INVENTION

It is known that flash media is utilized in a variety of environments. Heretofore, the flash media is provided as a separate media to a device. In so doing, an array of different types of modules must be provided to allow for a connection to a device such as a digital camera, MP3 player or flash reader. It is desirable to provide a memory module that could be utilized with a variety of devices. The memory module must be compatible with existing standards and be capable of operating as a module.

Accordingly, what is needed is a system and method for providing a plurality of memories to such a device without requiring multiple connectors or a controller within the memory module. The system should be cost effective, a simple modification and easily implementable into an existing device. The present invention addresses such a need.

SUMMARY OF INVENTION

A plurality of flash media are coupled to a single form factor connector to provide a module, i.e., referred to as a SmartStack module, that can be coupled directly to a SmartStack enabled device. The SmartStack module does not include a controller and is controlled from the host side. The form factor connector would typically be a CompactFlash (CF) form factor or other form factors that are used in a variety of devices. The SmartStack memory module in a preferred embodiment includes a write protect switch that will allow for certain portions of the memory within the SmartStack module not to be written to. In addition, a portion of the flash memory will be allocated to the secure area for storing information to implement various forms of security. Another portion of the flash memory is allocated to store optional biometric information such as a user's fingerprint or retinal scan information, etc.

In a preferred embodiment, the SmartStack module is a flash memory card in a CF Type I or II format. The card will not be compatible with CF readers, but will be compatible with SmartStack readers. Larger memory sizes will be available as larger flash memory chips become available. Finally, the SmartStack module will include a write protect switch.

BRIEF DESCRIPTION OF DRAWINGS

FIG. 3 is a table which illustrates how a particular card will be detected by a device.

FIG. 4 is a table that illustrates addressing of the SmartStack module.

FIG. 6 illustrates the SmartStack module which includes the write protect, security area and biometric area.

FIG. 7 illustrates adding RAM to SmartStack module to improve performance.

DETAILED DESCRIPTION

The present invention relates generally to memory modules and more particularly to a memory module which is coupled via a single connector. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

A plurality of flash media are coupled to a single form factor connector to provide a module, i.e., referred to as a SmartStack module, that can be coupled directly to the device. The SmartStack module does not include a controller and is controlled from the host side. The form factor connector would typically be a CompactFlash (CF) form factor or some other form factor that are used in a variety of devices. The SmartStack memory module in a preferred embodiment includes a write protect switch that will allow for certain portions of the memory within the SmartStack module not to be written to. In addition, a portion of the flash memory will be allocated to the secure area for storing information to implement various forms of security. Another portion of the flash memory is allocated to store optional biometric information such as a user's fingerprint or retinal scan information, etc.

Figure 1:
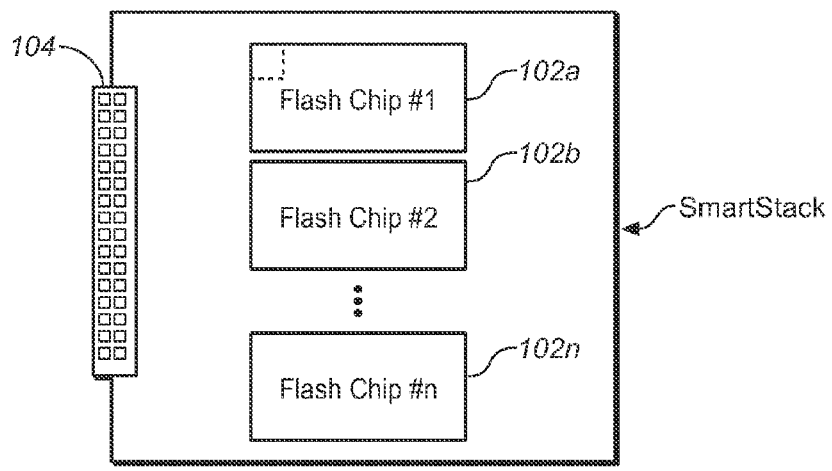
FIG. 1 illustrates a SmartStack module.

To more fully describe the present invention, refer now to the following description in conjunction with accompanying figures. FIG. 1 illustrates a SmartStack module 100. The SmartStack module 100 comprises a plurality of memory devices (i.e., flash chips 102a, 102b through 102n) coupled to a connector 104. In a preferred embodiment, the flash chips are coupled together such that there is redundancy for each section.

Figure 2:
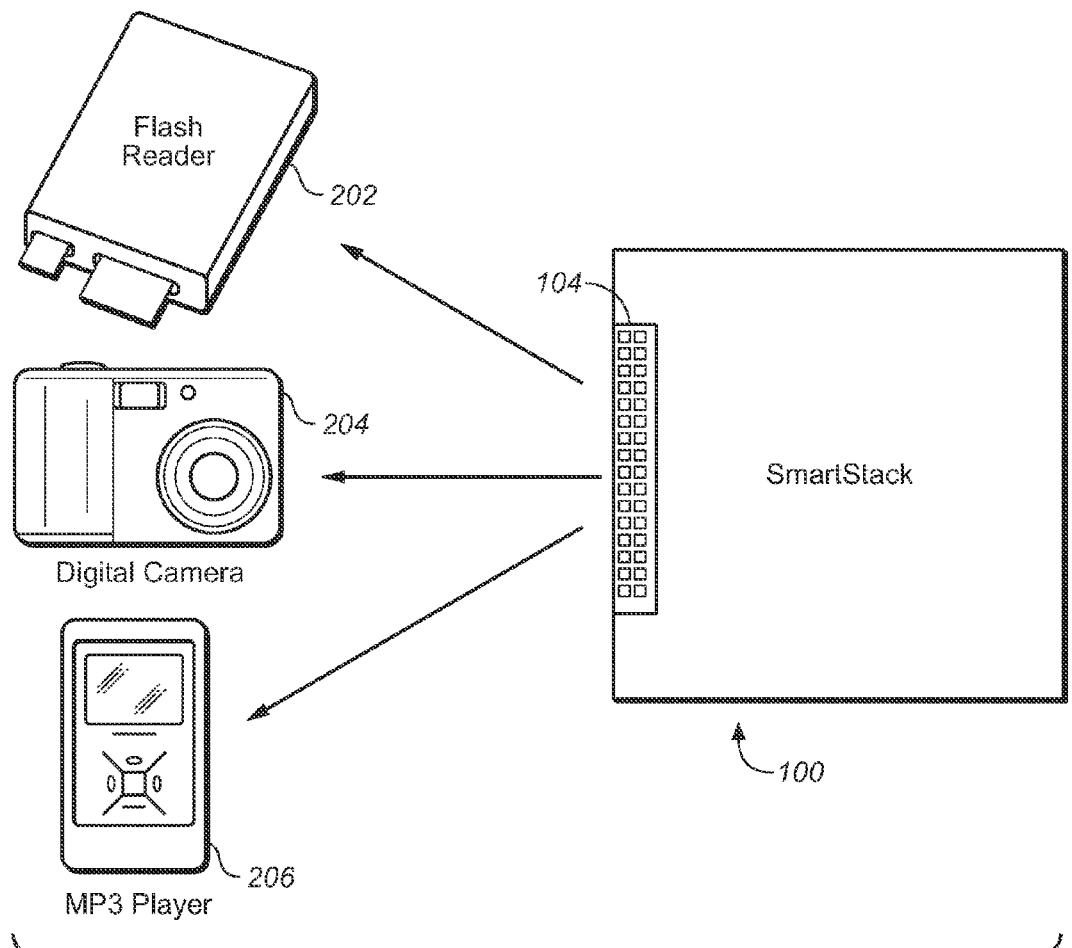
FIG. 2 illustrates examples of the kinds of applications that can utilize SmartStack modules, such as a flash reader, digital camera or MP3 player.

In a preferred embodiment the SmartStack module would have the same form factor as a CompactFlash (CF) card. The module could then be plugged into any CF slot. FIG. 2 illustrates examples of the kinds of applications that can utilize the SmartStack module 100, such as a flash reader 202, digital camera 204 or MP3 player 206. In a preferred embodiment, only SmartStack module 202 based CF readers can read/write to SmartStack media, and inserting a SmartStack module into standard CF readers will not damage the SmartStack. As is seen, the SmartStack module does not include a controller and is controlled from the host side. Since the module itself is devoid of any controller it can be expanded easily to add additional memory.

Card Detection FIG. 3 is a table which illustrates how a particular card will be detected by a device. In this embodiment, when the SmartStack module (i.e., SmartStack NAND or SmartStack NOR) is plugged into the slot, the card detect pins (CD1 and CD2) will be low. For compatibility with a device that can read a SmartStack module card, the card enable pins (CE1 and CE2) will also be low. As is also seen, the other memory modules will have a different pin configuration for detection.

Addressing FIG. 4 is a table which illustrates addressing of the SmartStack module. In a preferred embodiment, the SmartStack module will be programmed in a manner that is similar to a conventional memory module. The only difference will be the chip selects.

Figures 4A, 5:
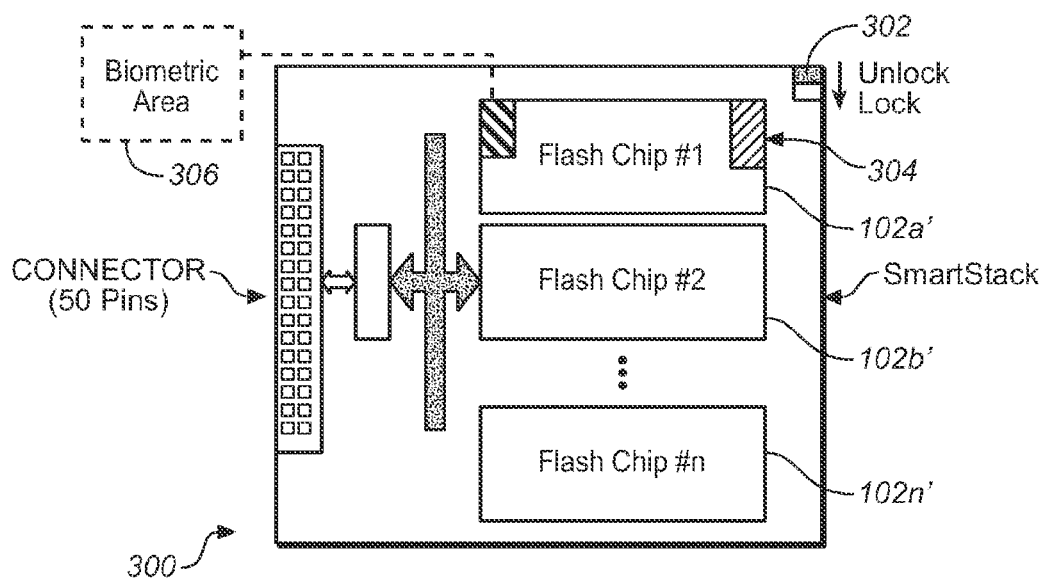
FIG. 4A is a table that illustrates the relationship between the SmartStack module address lines and their equivalent pins on a CompactFlash card.
FIG. 5 is a table which illustrates the setting of a secure area of data for the SmartStack module.

FIG. 4A illustrates the relationship between the SmartStack module address lines (S0 . . . S3) and their equivalent pins in a CompactFlash card.

Security and Biometric Information FIG. 5 illustrates a SmartStack module 300 which includes the write protect mechanism 302, security area 304 and biometric area 306. The write protect mechanism can be locked or unlocked to allow for writing to the module. The write protect mechanism in a preferred embodiment may be read by software to prevent writing in the user area. It may be necessary to allocate space for security and biometric on each of the individual flash media, in which case the same table will be used to create this information. As is seen in this embodiment, the biometric area 304 and secure area 306 are allocated on 102a'. One of ordinary skill in the art recognizes that the areas 302 and 304 could be located in any or all of the flash chips 102a"–102n" and that would be within the spirit and scope of the present invention.

FIG. 6 is a table which illustrates the setting of a secure area of data for the SmartStack module. For providing a secure area in the SmartStack module, in a preferred embodiment the following method will be followed: the first two bytes, byte 0 and byte 1, will be set to C3 B6. The next byte, byte 2, defines the function. In addition, byte 5 (block status flag) will always be set to 0xF0 (or 0x0F) to indicate a failed block so that an operating system or firmware will not write over it accidentally.

An additional improvement for performance would be to add random access memory (RAM) to the stack. FIG. 7 illustrates adding a RAM 402 to SmartStack module 400 to improve performance. By adding the RAM 402 to the module 400, data can be cached thereto thereby allowing for faster access to data in the module.

Additionally the SmartStack module can be designed to function like daughter boards on a base board so the capacity can be modularly increased. The SmartStack module can also be designed such that you can plug one card at the end of the previous one to form a chain (or daisy chain).

Figure 8:
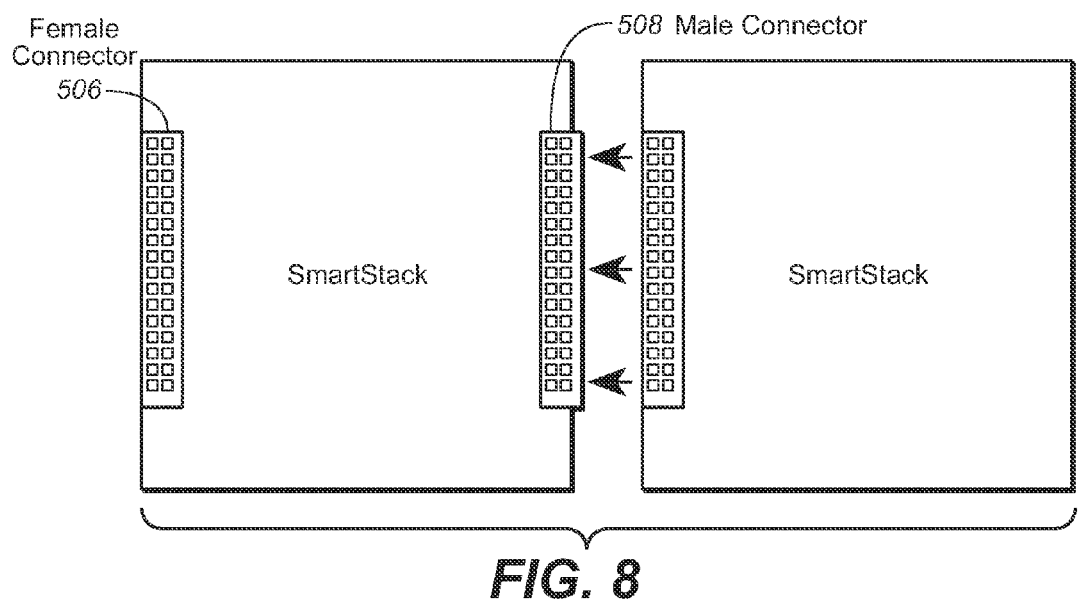
FIG. 8 illustrates daisy chaining a plurality of SmartStack modules in accordance with the present invention.

FIG. 8 illustrates daisy-chaining a plurality of SmartStack modules 500 and 502 in accordance with the present invention. Accordingly, in this embodiment, one SmartStack module 500 would include a female connector 506 on one end and a male (expansion port) connector 508 on the other to allow more cards to be plugged in. In an alternate embodiment, the expansion card can be itself devised to have several expansion ports (female connector) into which users can plug in SmartStack modules. The SmartStack module can optionally enable the user to have the capability of being able to review the pictures before committing it (saving it) to the flash media itself.

Figure 9:
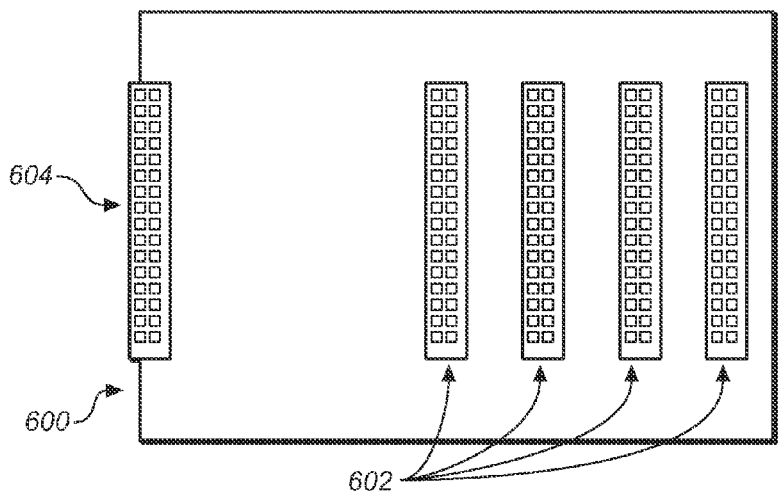

FIG. 9 illustrates a SmartStack module 600 which is an expansion bay. In this embodiment, additional SmartStack modules can be plugged into male connection slots 602 and the female connection 604 would connect to a SmartStack enabled CompactFlash Host.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

The invention claimed is:

1. A memory module, comprising:
   a memory residing at the memory module that is controlled by a controller on a separate host device, the memory module having no controller;
   a connector coupled with the memory device having a form factor to interface with the host device, the connector to interface with a plurality of types of host devices; and
   a pin assembly on the connector for the separate host device to determine that the memory module does not have the controller and uses the controller at the separate host device to control the memory residing at the memory module; and
   a second connector to interface with a second memory module having one or more memory.

2. The memory module of claim 1, wherein the pin assembly comprises a first and second card enable pin, the first and second card enable pins are low to indicate to the host device that the memory module has no controller.

3. The memory module of claim 1, wherein the memory has a security information area.

4. The memory module of claim 1, wherein the memory has a biometric information area.

5. The memory module of claim 1, wherein the memory comprises a flash memory.

6. The memory module of claim 5, wherein the form factor is selected from a group consisting of a CompactFlash form factor, a Secure Digital (SD) form factor, a MultiMedia Card (MMC) form factor, and a Memory Stick form factor.

7. The memory module of claim 5, further comprising a random access memory (RAM) coupled with the memory.

8. The memory module of claim 7, wherein the RAM is coupled between the connector and the memory, and the RAM comprises a cache memory.

9. The memory module of claim 7, wherein a user can review a content stored in the RAM before the content is written to the memory.

10. The memory module of claim 1, further comprising a plurality of connectors, the plurality of connectors to interface with a plurality of memory modules.

11. The memory module of claim 1, wherein the plurality of types of host devices includes a digital camera, a portable music player, a personal computer (PC), a flash memory reader, a personal digital assistant (PDA), and a device using removable memory.

12. A memory module, comprising:
   a memory residing at the memory module that is controlled by a controller on a host device;
   a connector coupled with the memory having a CompactFlash form factor to interface with a plurality of types of host devices; and
   a set of pins on the connector to indicate to the separate host device a type of the memory module comprising a first and second card enable pin, the first and second card enable pins are low to indicate to the host device that the memory module has no controller and to instruct the host device to control the memory; and
   a second connector to interface with a second memory module having one or more memory.

13. The memory module of claim 12, wherein the memory comprises a flash memory.

14. The memory module of claim 13, further comprising a random access memory (RAM) coupled between the connector and the memory.

15. The memory module of claim 14, wherein the RAM comprises a cache.

16. A memory module, comprising:
   a memory including a security area and residing at the memory module;
   a connector coupled with the memory, the connector to interface with a host device including a controller for the memory, the connector to interface with a plurality of types of host devices, the connector has a form factor; and
   a portion of the connector including pins used to transfer data over the connection to for the host device to determine whether the memory module ahs the controller; and
   a second connector to interface with a second memory module having one or more memory.

17. The memory module of claim 16, wherein the security area includes a biometric information area.

18. The memory module of claim 16, wherein the cache comprises a random access memory (RAM).

19. The memory module of claim 16, further comprising a write protect switch.

20. The memory module of claim 16, wherein the portion of the connector comprises a first and second card enable pin, the card enable pins are low to indicate to the host device that the memory module has no controller.

21. The memory module of claim 16, further comprising a plurality of connectors, the plurality of connectors to interface with a plurality of memory modules.

* * * * *

UNITED STATES PATENT AND TRADEMARK OFFICE
CERTIFICATE OF CORRECTION

| | | |
|---|---|---|
| PATENT NO. | : 7,252,240 B1 | Page 1 of 1 |
| APPLICATION NO. | : 10/063021 | |
| DATED | : August 7, 2007 | |
| INVENTOR(S) | : Larry Lawson Jones et al. | |

It is certified that error appears in the above-identified patent and that said Letters Patent is hereby corrected as shown below:

In Column 5,
Lines 14-15, replace "the connector has a form factor" with --the connector having a form factor--

In Column 5,
Lines 17-19, replace "to for the host device to determine whether the memory module ahs the controller" with --for the host device to determine whether the memory module has a controller--

Signed and Sealed this

Thirtieth Day of October, 2007

JON W. DUDAS
*Director of the United States Patent and Trademark Office*